United States Patent [19]

Minami et al.

[11] Patent Number: 4,777,583

[45] Date of Patent: Oct. 11, 1988

[54] THERMAL HEAD

[75] Inventors: Keijiro Minami, Kagoshima; Yasuo Nishiguchi, Kokubu, both of Japan

[73] Assignee: Kyocera Corporation, Kyoto, Japan

[21] Appl. No.: 811,091

[22] Filed: Dec. 18, 1985

[30] Foreign Application Priority Data

Dec. 19, 1984 [JP] Japan .......................... 59-193658[U]

[51] Int. Cl.[4] ................................................ G01C 5/10

[52] U.S. Cl. ................................ 346/76 PH; 219/547

[58] Field of Search .................... 400/120; 346/76 PH, 346/76 R; 219/216 PH, 543

[56] References Cited

U.S. PATENT DOCUMENTS 4,130,752 12/1978 Conta et al. .................... 346/76 PH 4,259,564 3/1981 Ohkubo et al. ................ 346/76 PH

*Primary Examiner*—Arthur G. Evans

*Attorney, Agent, or Firm*—Spensley, Horn, Jubas & Lubitz

[57] ABSTRACT

In a thermal head comprising a ceramic substrate, a glaze layer partially formed on the ceramic substrate, heat-generating resistors and electrodes connected to both the ends of the heat-generating resistors, if the width of individual electrodes located outside the glaze layer is made narrower than the width of corresponding electrodes on the glaze layer, formation of a short circuit between adjacent individual electrodes because of the presence of voids on the ceramic substrate can be effectively prevented.

7 Claims, 3 Drawing Sheets

THERMAL HEAD

BACKGROUND OF THE INVENTION (1) Field of the Invention

The present invention relates to a thermal head for recording letters, symbols and the like on a heat-sensitive recording medium such as a heat-sensitive recording paper. More particularly, the present invention relates to an improvement of a thermal head of the type where a glaze layer is partially formed below a heat-generating resistor, in which formation of short circuits among electrodes is prevented even in the presence of voids on a ceramic substrate and the resolving power or image sharpness of heat-sensitive recording is enhanced.

(2) Description of the Prior Art

A thermal head for heat-sensitive recording has heretofore been used in a thermal printer of a facsimile or computer, and as shown in FIG. 4, the conventional thermal head comprises a glaze layer 11 formed on a ceramic substrate 10, a plurality of head-generating resistors 12 arranged in a line at small intervals on the glaze layer 11, and common electrodes 13 and individual electrodes 14 connected to both the front and rear ends, relatively to the delivery direction P of the heat-sensitive recording medium, of the heat-generating resistors 12.

The glaze layer 11 exerts such functions that heat generated by application of electricity to the heat-generating resistors 12 is not allowed to escape into the ceramic substrate 10 and the temperature of the heat-generating resistors 12 is promptly elevated to a desired level, and when application of electricity to the heat-generating resistors 12 is stopped, the heat possessed by the heat-generating resistors 12 is discharged at a high efficiency and the heat-generating resistors 12 are promptly cooled. Accordingly, if pulse voltages are applied to the heat-generating resistors 12, desired letters or symbols are printed on the heat-sensitive recording paper.

The glaze layer is divided into a partial glaze layer partially formed on the ceramic substrate 10 as shown in FIG. 4 and an entire glaze layer formed on the entire surface of the ceramic substrate. In case of the entire glaze layer, since the surface of the thermal head is flat, when a heat-sensitive recording paper is pressed to the thermal head by a platen, the pressing force is dispersed and the contact pressure between the heat-sensitive recording paper and the heat-generating resistors is insufficient, and therefore, beautiful printing is impossible. Moreover, a large amount of glass is necessary for formation of the glaze layer and the cost is increased. In contrast, in case of the partial glaze layer, only the glaze layer-formed portion of the surface of the thermal head rises and heat-generating resistors are formed on this rising portion, and therefore, when a heat-sensitive recording paper is pressed to the thermal head by a platen, the above defect of the entire glaze layer is not caused. Namely, the heat-sensitive recording paper can be contacted with the heat-generating resistors by an appropriate pressing force and beautiful printing is possible. Moreover, the partial glaze layer is advantageous in that the amount of glass can be reduced and the manufacturing cost can be decreased. Because of these advantages, the partial glaze layer is mainly adopted for thermal heads at the present.

Recently, eight heat-generating resistors are formed in 1 mm (8 dot/mm), but there is a trend to form 16 heat-generating resistors in 1 mm (16 dot/mm) for forming sharp prints. In this case, the width (t) of the clearance between adjacent electrodes is very narrow and, for example, about 10 microns, and the following problem arises.

Namely, in a thermal head of the partial glaze layer, most of electrode for applying electricity to heat-generating resistors are directly formed on the ceramic substrate, not through the glaze layer. For formation of electrodes on the ceramic substrate, as shown in FIG. 5, a heat-generating resistor layer 15 and an electrode layer 16 are formed on the entire top surface of the ceramic substrate 10 according to the film-forming technique (see FIG. 5-B), and a photoresist film 17 is formed thereon by spin coating (see FIG. 5-C). Then, a photomask 18 having a predetermined pattern is placed on the photoresist film 17 and the assembly is exposed to light to effect reaction in the predetermined portion of the photoresist film 17 (see FIG. 5-D). Then, development is carried out, and the photoresist film reacted by the light exposure is removed (FIG. 5-E) and the exposed electrode layer 16 and heat-generating resistor layer 15 are etched (see FIG. 5-F). Finally, the remaining photoresist film 17 is removed.

In this case, however, many voids (empty pores) having a diameter of about 10 microns are present in the surface of the ceramic substrate (see FIG. 5-A), and if such voids are located in the area where the heat-generating resistor layer and electrode layer are removed by etching, as shown in FIG. 5-D, the thickness of the photoresist film 17 on the voids 19 is increased and the photoresist film 17 in this portion is not completely reacted. Accordingly, at the subsequent etching step, as shown in FIG. 5-F, the electrode layer 16 and heat-generating resistor layer 15 are not completely removed by etching, with the result that a short circuit is formed between adjacent heat-generating resistors or adjacent electrodes.

SUMMARY OF THE INVENTION

Under this background, it is a primary object of the present invention to provide a valuable thermal head in which even if the number of heat-generating resistors is increased to 16 and the intervals between adjacent resistors or electrodes are narrowed, a short circuit is not formed between adjacent resistors or electrodes, and the advantages of the partial glaze layer are sufficiently exerted.

According to the present invention, this object can be attained by a thermal head of the above-mentioned type, in which the width of electrodes formed directly on the ceramic substrate is narrower than the width of electrodes formed on the glaze layer.

Incidentally, by "to form electrodes directly on the ceramic substrate", it is meant that electrodes are formed on the ceramic substrate with no intervening glaze layer. Accordingly, the case where, as shown in FIG. 2, a heat-generating resistor layer is formed on the ceramic substrate and electrodes are then formed thereon is included.

More specifically, in accordance with the present invention, there is provided a thermal head, which comprises a ceramic substrate, a glaze layer partially formed on the ceramic substrate and extending in a certain direction of the ceramic substrate, a number of heat-generating resistors arranged at small intervals in the longitudinal direction of the glaze layer to cover the glaze layer, individual electrodes connected to one end portions of the heat-generating resistors, and common electrodes connected to the other end portions of the heat-generating resistors, wherein the individual electrodes are extended from the ceramic substrate to the heat-generating resistors through the glaze layer and the width of the individual electrodes locate outside the glaze layer is narrower than the width of the corresponding electrodes located on the glaze layer.

The thermal head of the present invention is preferably prepared according to a process comprising (i) preparing a laminate comprising a ceramic substrate, a glaze layer formed partially on the ceramic substrate and extending in a certain direction of the substrate, a heat-generating resistor layer formed substantially on the entire surface inclusive of the glaze layer and an electrode layer formed substantially on the entire surface of the heat-generating resistor layer, (ii) forming a photoresist film on the electrode layer to form a first resist film pattern, (iii) etching the exposed electrode layer and heat-generating resistor layer through the first resist film pattern to form divided electrode films and heat resistors arranged in the longitudinal direction of the glaze layer, (iv) forming a photoresist film on the electrode films of the etched laminate and performing light exposure and development to form a second resist film pattern, and (v) selectively etching the exposed electrode films of the glaze layer through the second resist film pattern to separate individual electrodes from common electrodes, though the preparation process is not limited to this process.

BRIEF DESCRIPTION OF THE DRAWINGS

FIG. 1 is a view showing the section taken along the line A—A in FIG. 1.

Figure 1:
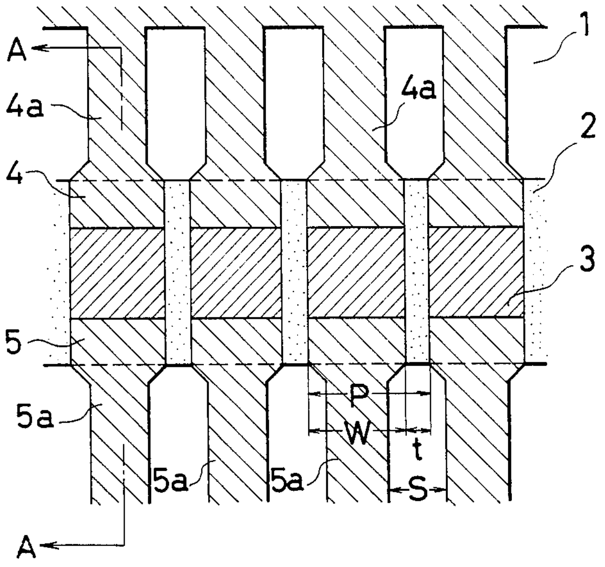
FIG. 1 is a plane view showing an embodiment of the thermal head according to the present invention.

In the drawings, reference numeral 1 represents a ceramic substrate, reference numeral 2 represents a glaze layer, reference numeral 3 represents a heat-generating resistor, reference numerals 4 and 5 represent electrodes, and reference numeral 4$a$ and 5$a$ represent electrodes formed directly on the ceramic substrate, respectively.

DETAILED DESCRIPTION OF THE PREFERRED EMBODIMENTS

Figure 2:
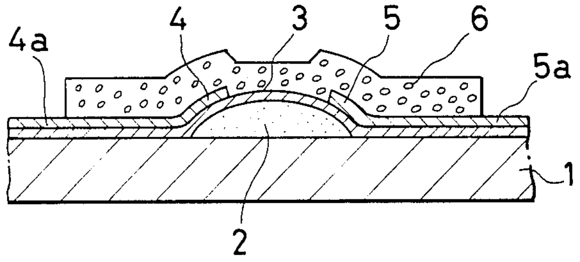

FIG. 1 is a plane view showing one embodiment of the present invention and FIG. 2 is a view showing the section taken along the line A—A in FIG. 2. Reference numerals 1, 2, 3, 4, 5 and 6 represent a ceramic substrate, a glaze layer, a heat-generating resistor, a common electrode, an individual electrode and a protecting film, respectively. A known alumina ceramic is used as the ceramic substrate 1 and this ceramic substrate 1 can be prepared by molding and sintering according to the known tape-forming method. From the economical viewpoint, an alumina ceramic is preferred, but any of ceramic excellent in the electrically insulating property and the heat resistance can be used. For example, there can be mentioned oxide ceramics such as mullite and zirconia, nitride ceramics such as silicon nitride, titanium nitride and aluminum nitride, and carbide ceramics such as silicon carbide and titanium carbide. Furthermore, composite ceramics composed of two or more of these ceramics can be used.

The glaze layer 2 is partially formed on the ceramic substrate 1. Namely, the glaze layer 2 is formed on the ceramic substrate 1 so that it extends with a small width in a certain direction, that is, in the direction orthogonal to the paper feed direction in the thermal head. From the viewpoint of the durability, it is preferred that the glaze layer 2 be composed of a glass composition having a thermal expansion coefficient substantially equal to that of the ceramic substrate 1. An example of the glaze composition suitable for the alumina ceramic substrate comprises 60% (all of "%" given hereinafter are by weight unless otherwise indicated) of $SiO_2$, 8% of BeO, 8% of $Al_2O_3$, 8% of CaO, about 2% of $ZrO_2$, about 2% of ZnO and about 2% of $SrO_2$ and has a thermal conductivity of 0.0196 cal/cm.deg.sec and a linear thermal expansion coefficient of $67.4\times10^{-7}$/°C. The size of the glaze layer 2 is changed according to the intended use, but it is preferred that the maximum thickness be 50 to 60 microns and the width be about 1 mm.

Figure 3:
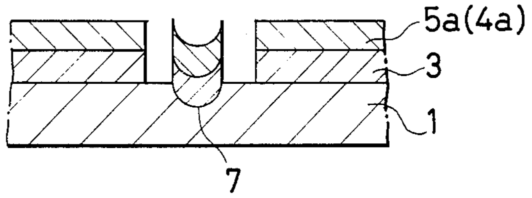
FIG. 3 is a sectional view showing spaces between adjacent electrodes.
Figure 4:
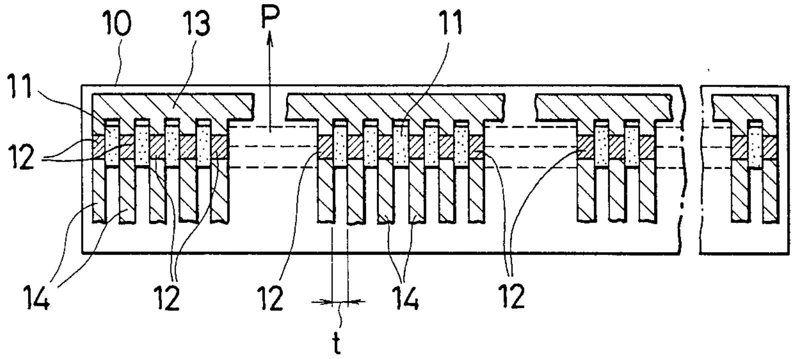
FIG. 4 is a diagram illustrating the entire structure of the thermal head.
Figure 5:
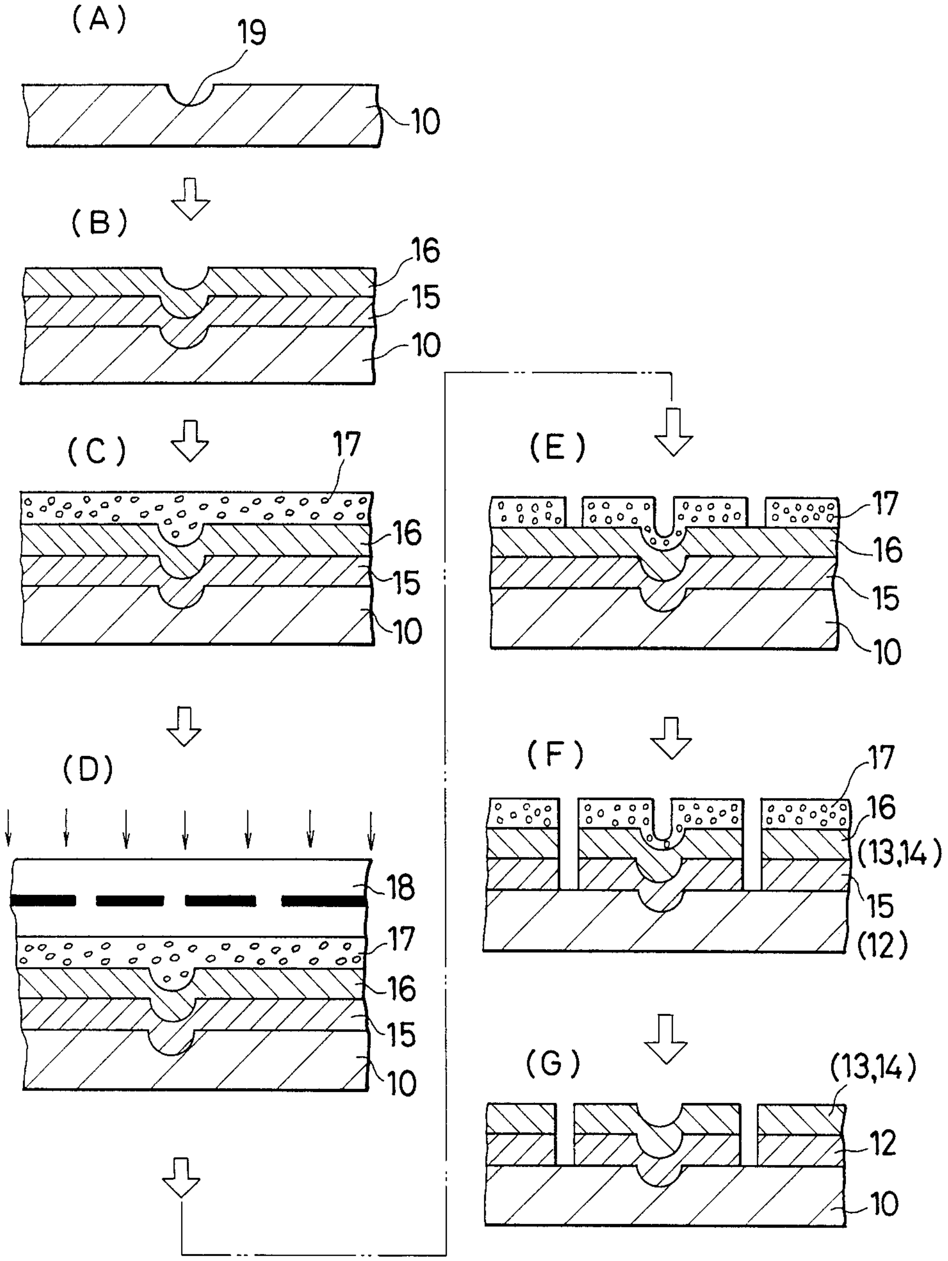
FIG. 5 is a diagram illustrating the defects of the conventional thermal head.

The heat-generating resistors 3 and electrodes 4 and 5 are formed to have shapes as shown in FIG. 1. A number of independent rows of heat-generating resistors 3 are formed on the glaze layer 2 at small intervals t in the longitudinal direction, and electrodes 4 and 5 having a width W are formed on the glaze layer 2 at small intervals t in the longitudinal direction. In the present invention, it is indispensable that the width (P-S) of the individual electrode 5$a$ located outside the glaze layer should be narrower than the width ($W=P-t$) of the corresponding electrode 5 located on the glaze layer. If the width of the electrode portion 5$a$ located outside the glaze layer is thus narrowed, even when heat-generating resistors are formed at such a high density as 16 dot/mm, the intervals S of the electrodes 5$a$ formed directly on the ceramic substrate 1 are broadened and can be made larger than the diameters of voids present on the surface of the ceramic substrate. Accordingly, as shown in FIG. 3, when electrodes are formed on the ceramic substrate according to a method as shown in FIG. 5, even if there was present portions that cannot be etched because of the presence of voids, these portions 7 that cannot be etched are not bridged to each other between adjacent electrodes and formation of a short circuit between adjacent electrodes 5 is prevented.

Incidentally, the degree of narrowing of the width of the electrode portion 5$a$ formed directly on the ceramic substrate 1 over the width of the electrode formed on the glaze layer is appropriately determined in view of the estimate size of voids on the surface of the ceramic substrate.

It is generally preferred that the width of the individual electrodes 5$a$ located outside the glaze layer 2 be 70 to 90% of the width of the corresponding electrodes 5 located on the glaze layer 2 and the intervals between every two adjacent individual electrodes be larger than 10 microns.

Titanium, chromium silicate (Cr—Si—O), tantalum silicate Ta—Si—O) and tantalum nitride ($Ta_2N$) may be used as the heat-generating resistor 3, and it is generally preferred that the thickness of the heat-generating resistors 3 be 0.05 to 0.5 micron. Aluminum or gold is used as the material constituting the electrodes 4 and 5, and it is preferred that the thickness of the electrodes 4 and 5 be 0.5 to 2.0 microns.

According to an especially preferred embodiment of the present invention, the density of the heat-generating resistors 3 is, for example, 16 dot/mm, which is two times as high as the density in the conventional thermal head, and each of the electrode pitch P, the electrode width W and the space t between adjacent is ½ of the value in the conventional thermal head, and the values P, W and t are 62.5 microns, 52.5 microns and 10 microns, respectively and the value S is 20 to 30 microns.

Incidentally, the heat-generating resistors 3 are formed not only on the glaze layer 2 but also on the ceramic substrate 1, and they are overlapped on the electrodes 4 and 5 having a low resistivity, except a part of the glaze layer 2. Accordingly, heat is not generated from the portions overlapped on the electrodes 4 and 5 when electricity is applied and heat is generated only from the parts not covered by the electrodes 4 and 5 on the glaze layer 2.

The narrow-width electrode portions may cover not only the ceramic substrate 1 outside the glaze layer 2 but also the portion where the glaze layer 2 is present. However, if the width of the electrodes 4 and 5 is narrowed along the entire length, since the width of the end portions of the electrodes 4 and 5 becomes narrower than the width of the heat-generating resistors 3, the electric current flowing in the heat-generating resistors 3 is concentrated in the central portion when electricity is applied, but the electric current does not flow in the peripheral portion. Because of this uneven distribution of the electric current, it becomes difficult to generate heat uniformly on the entire surface. Therefore, it is preferred that the width of the end portions of the electrodes 4 and 5 connected to the heat-generating resistors 3 be equal to the width of the heat-generating resistors 3.

In the embodiment shown in FIG. 1, also on the side of the common electrodes 4 and 4*a*, electrode shapes of a pattern similar to that of the electrodes 5 and 5*a* are formed linearly symmetrically with the glaze layer 2. However, this pattern need not always be formed for the common electrodes 4 and 4*a*, and it should be understood that a solid electrode pattern may be formed.

A protecting film 6 may be formed on the heat-generating resistors 3 and the electrodes 4 and 5, as shown in FIG. 2. A material excellent in the oxygen barrier property, the thermal conductivity, the electrically insulating property and the abrasion resistance, such as tantalum pentoxide, is used for the protecting film 6, and the thickness of the protecting film 6 is ordinarily 1.0 to 8.0 microns.

When the thermal head of the present invention is actually used, the other ends of one electrodes (individual electrodes) 5 are connected to driving IC (not shown) and the heat-generating resistors 3 are selectively actuated by this IC, whereby Joule heat is generated from the heat-generating resistors 3 to effect coloration in a heat-sensitive recording paper pressed by a platen and printing is accomplished.

The thermal head of the present invention is preferably prepared from the laminated (i) described above according to the above-mentioned process. Light exposure and development are carried out through a first photoresist film such that patterns corresponding to the electrodes 4*a*, 4, 5 and 5*a* are formed. A known polymeric photoresist material, for example, a photodimerization type photosensitive polymer, a photopolymerization type photosensitive polymer, a photo-decomposition type photosensitive polymer or a polymer composition containing a photo-reactive compound such as an azide compound may be used for the photoresist film. The liquid to be used at the first etching step is capable of dissolving both the electrode film and the heat-generating resistor film. For example, a mixed acid of phosphoric acid and nitric acid is used for removal of the electrode film and hydrofluoric acid is used for removal of the heat-generating resistor film. The second photoresist film pattern is such that in FIG. 1, a part of the electrode film on the glaze layer 2 is removed to expose the heat-generating resistor layer 3, and a mixed acid for dissolving the electrode film is used for this second etching step.

As is apparent from the foregoing description, according to the present invention, formation of a short circuit between adjacent electrodes by the presence of voids on the surface of the ceramic substrate can be assuredly prevented, and therefore, the density of heat-generating resistors can be increased and beautiful printing becomes possible. Furthermore, the manufacturing cost of the thermal head can be reduced.

Moreover, the trouble of formation of a short circuit between adjacent electrodes because of the presence of voids can be eliminated by means of reducing the electrode width. Therefore, the existing apparatus and method can be used only by changing the pattern of the photomask, and there can be attained an advantage that the product of the present invention can be directly prepared by using the existing operation apparatus.

What is claimed is;

1. A thermal head, comprising:
(a) a ceramic substrate;
(b) a glaze layer covering less than the entire surface of the ceramic substrate and extending in a certain direction of the ceramic substrate;
(c) a number of heat-generating resistors formed on the glaze layer and arranged at small intervals in the longitudinal direction of the glaze layer;
(d) individual electrodes each connected to one end portion of each heat-generating resistor; and
(e) common electrodes connected to the other end portions of the heat-generating resistors, wherein said thermal head is prepared according to a process comprising the steps of:
(i) preparing a laminate comprising a ceramic substrate, a glaze layer covering less than the entire surface of the ceramic substrate and extending in a certain direction of the substrate, a heat-generating resistor layer formed substantially on the entire surface of the substrate inclusive of the glaze layer and an electrode layer formed substantially on the entire surface of the heat-generating resistor layer;
(ii) forming a photoresist film on the electrode layer to form a first resist film pattern;
(iii) etching the exposed electrode layer and heat-generating resistor layer through the first resist film pattern to form a number of independent rows of electrode layers and heat-generating resistors arranged at small intervals in the longitudinal direction of the glaze layer;
(iv) forming a photoresist film on the electrode layers of the etched laminate and performing light exposure and development to form a second resist film pattern; and
(v) selectively etching the exposed electrode layers on the glaze layer through the second resist film pattern to separate individual electrodes from common electrodes, said independent rows are extended from the ceramic substrate to the glaze layer, and the width of the individual rows located outside the glaze layer is narrower than the width of the corresponding rows located on the glaze layer.

2. A thermal head as set forth in claim 1, wherein the ceramic substrate is a sintered alumina body.

3. A thermal head as set forth in claim 1, wherein the glaze layer is composed of a glass composition having a thermal expansion coefficient substantially equal to that of the ceramic substrate.

4. A thermal head as set forth in claim 1, wherein the glaze layer extends in a direction orthogonal to the paper feed direction of the thermal head.

5. A thermal head as set forth in claim 1, wherein the heat-generating resistors are composed of a material selected from titanium, chromium silicate, tantalum silicate and tantalum nitride and the electrodes are composed of aluminum or gold.

6. A thermal head as set forth in claim 1, wherein the width of the individual electrodes located outside the glaze layer is 70 to 90% of the width of the corresponding electrodes located on the glaze layer, and the intervals between adjacent electrodes located outside the glaze layer are larger than 10 microns.

7. A thermal head as set forth in claim 4, wherein the width of the individual electrodes located on the glaze layer is substantially the same as the width of the heat-generating resistors.

* * * * *